Figure 1:
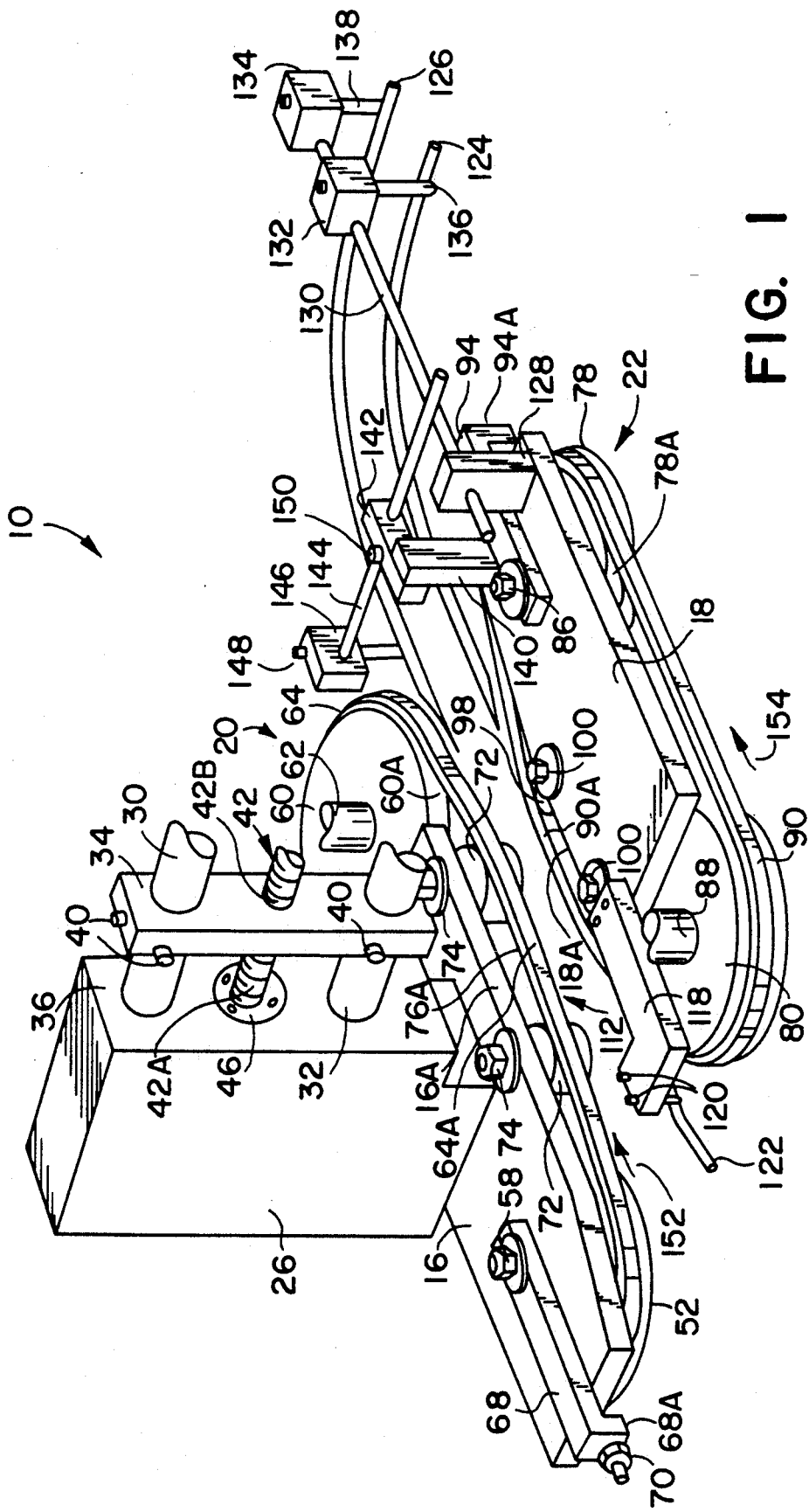

United States Patent [19]

Palazzolo

[11] Patent Number: 5,257,560
[45] Date of Patent: Nov. 2, 1993

[54] TRIMMER FOR REMOVING SCRAPING FROM TOPS OF PLASTIC BOTTLES

[75] Inventor: Robert J. Palazzolo, Williamston, Mich.

[73] Assignee: M. C. Molds, Inc., Williamston, Mich.

[21] Appl. No.: 944,536

[22] Filed: Sep. 14, 1992

[51] Int. Cl.$^5$ .......................... B23B 3/04; B23B 5/14
[52] U.S. Cl. ........................................ 82/46; 82/101; 82/102; 83/171; 83/914; 264/161
[58] Field of Search ................... 82/46, 101, 100, 102; 83/171, 914; 264/161, 536

[56] References Cited

U.S. PATENT DOCUMENTS

| 3,352,404 | 11/1967 | Settembrini . |
| 3,429,211 | 2/1969 | Pelot . |
| 3,541,905 | 11/1970 | Mey . |
| 3,675,521 | 7/1972 | Ziegler . |
| 3,728,063 | 4/1973 | Langecker . |
| 3,800,638 | 4/1974 | Duikers et al. . |
| 3,886,824 | 6/1975 | Michel et al. . |
| 3,962,938 | 6/1976 | Reilly et al. . |
| 3,967,516 | 7/1976 | Griesing et al. . |
| 4,445,406 | 5/1984 | Thatcher . |
| 4,614,018 | 9/1986 | Krall . |
| 4,876,930 | 10/1989 | Thatcher . |
| 5,019,028 | 5/1991 | Engel et al. ...................... 82/101 X |
| 5,163,347 | 11/1992 | LeNaour et al. ................. 82/101 X |

Primary Examiner—Timothy V. Eley
Attorney, Agent, or Firm—Ian C. McLeod

[57] ABSTRACT

A trimmer apparatus (10) comprising dual moveable belts (64) and (90) for removing a dome scrap (12) from a hollow, blow molded plastic bottle (14), is described. The dual belts are supported on spaced apart pulley systems (20) and (22) forming a linear path (24) along which the bottle travels. The distance between the pulley system is adjustable for different size bottles. A groove (12A) on the dome scrap is engaged by the belts which are rotating in a similar direction. However, one belt is moving somewhat faster than the other. This provides for moving the bottle linearly along the path, while spinning the bottle. As the bottle spins past a knife blade (112) the dome scrap cut from the bottle.

21 Claims, 4 Drawing Sheets

TRIMMER FOR REMOVING SCRAPING FROM TOPS OF PLASTIC BOTTLES

BACKGROUND OF THE INVENTION (1) Field of the Invention

The present invention relates to an improved spin trimming apparatus particularly for a blow molded container. In particular, the present invention relates to a spin trimming apparatus for removing an upper dome scrap from a hollow, blow molded plastic container, such as a plastic bottle. The spin trimming apparatus is comprised of a pair of rotating belts mounted above and on opposite sides of a conveyor for the bottle. The bottle is placed on the conveyor in an upstanding position, upstream from the trimming apparatus and the conveyor feeds the bottle into a chute comprised of opposed rails that mate with an annular groove provided on the dome scrap. The chute helps to keep the bottle in the upstanding position with the longitudinal axis of the bottle aligned along the vertical until the dome scrap is contacted by the rotating belts. The belts engage the dome in a groove between two annularly enlarged portions of the dome and serve to both spin the bottle while moving the bottle, in conjunction with the conveyor through the trimming apparatus. A knife is horizontally mounted below the belts at a height that corresponds to a notch provided at the base of the dome scrap. The knife point projects into the neck of the bottle.

As the bottle spins through the trimming apparatus, a razor edge of the knife cuts into the notch to remove the dome scrap from the bottle. The belts are each mounted on a pair of pulley wheels. Each pair of pulley wheels is controlled by a drive means which rotate the belts in a similar counterclockwise direction so that the belts move in opposite directions on the groove in the dome scrap of the bottle. This provides for spinning the bottle because the inner portion of the first belt is moving in a forward direction corresponding to the direction of travel of the conveyor belt moving through the trimming apparatus as the inner portion of the second belt moves in a backwards direction. The first belt is greater in length than the second belt such that the first belt engages the bottle first which pulls the bottle into the trimming apparatus before the second belt makes contact with the bottle. Additionally, the first belt extends further and remains in contact with the bottle after the second belt has lost contact which causes the scrap dome to be carried out of the trimming apparatus. The first belt is rotating at a slightly faster rate than the second belt, which causes the bottle to advance through the trimming apparatus while at the same time spinning on its axis. Preferably, the knife is provided with a heater means. This helps the razor edge melt the plastic material as the knife cuts the dome scrap from the bottle to provide a smooth, clean cut at the top of the bottle.

(2) Prior Art

A spin trimming apparatus using only a single moveable belt is described in U.S. Pat. No. 4,445,406 to Thatcher. This trimming apparatus is comprised of a belt support bar, which supports the moveable belt, and an opposite bottle dome support bar. The belt support bar and the bottle dome support bar are mounted above a conveyor belt, which moves the bottle through the support bars and the trimming apparatus. The bottle dome support bar has a pair of longitudinal grooves that mate with corresponding rim portions on the dome. The rim portions form an intermediate dome groove that is contacted by the moveable belt to spin the bottle along the support bars and through the trimming apparatus. A trimming knife blade is mounted along the length of the bottle dome support bar with the cutting edge of the knife extending progressively inwardly towards the path of the bottle moving along the conveyor, through the trimming apparatus. This provides for cutting the dome from the bottle as the bottle moves down the knife edge. The problem is that the support bar and moveable belt tend to spin the bottle at a slow rate. This necessitates that the knife blade be a relatively long member, extending a substantial distance along the length of the bottle dome support bar.

U.S. Pat. No. 3,429,211 to Pelot describes a similar device where a dome portion is removed by means of a moveable belt that advances the bottle along the cutting edge of an angled knife blade.

U.S. Pat. No. 4,876,930 to Thatcher describes an improved spin trimming apparatus which is capable of positioning the bottle being trimmed in a predetermined orientation with respect to its starting orientation to ready the bottle for a subsequent finishing operation in a production line.

Several prior art trimming apparatus have rotating devices such as a rotating wheel or a turret that rotates a hollow, plastic bottle in an arcuate path past a stationary knife edge to trim dome scrap from the bottle. This type of device is illustrated in U.S. Pat. Nos. 3,675,521 to Ziegler; 3,800,638 to Duikers et al; 3,962,938 to Reilly et al; 3,886,824 to Michel et al and 4,614,018 to Krall U.S. Pat. No. 3,967,516 to Griesing et al describes a trimming apparatus having a rotating wheel that moves the bottle in an arcuate path along a fixed guide while a rotating blade trims the dome scrap from the bottle. These trimmer apparatuses tend to be extremely complicated, which can translate into substantial down time for a production line if a part of the apparatus malfunctions.

Other types of trimming and cutting apparatuses are shown by U.S. Pat. No. 3,541,905 to Mey, which describes a device for radially cutting tubular workpieces to form piston rings or cylinder liner blanks, and the like. U.S. Pat. No. 3,728,063 to Langecker describes an apparatus that removes neck waste from a hollow plastic bottle with a striker operated by a piston-cylinder mechanism. U.S. Pat. No. 3,352,404 to Settembrini is only generally related to the present invention and describes an air-pervious conveyor belt for maintaining a plastic bottle on a conveyor belt in a stable position.

What is needed is a trimmer apparatus for blow molded hollow, plastic bottles that is relatively simple in construction and that uses a belt system to spin the bottles down a longitudinal path through the trimmer apparatus wherein the bottle moves past a knife edge which removes the dome scrap from the bottle.

OBJECTS

It is therefore an object of the present invention to provide a trimmer apparatus for removing dome scrap from a hollow, plastic bottle which spins the bottle as the bottle moves along a linear path through the trimmer apparatus and past a knife edge to remove the dome scrap from the bottle. Further, it is an object of the present invention to provide a trimmer apparatus that is comprised of dual moveable belts that contact opposite sides of the dome scrap of a plastic bottle to simultaneously spin the bottle as the bottle advances along a linear path past a knife edge that severs the dome scrap from the bottle. Still further, it is an object of the present invention to provide a trimmer apparatus for removing dome scrap from a hollow, plastic bottle that is comprised of dual moveable belts having different linear rates of travel that serve to spin the bottle while advancing the bottle along a linear path, past a knife edge to sever the dome scrap from the bottle. Further, it is an object of the present invention to provide a trimmer apparatus which is relatively uncomplicated but reliable and can be adjusted to provide for various shapes and diameters of bottles. Finally, it is an object of the present invention to provide a spin trimmer apparatus that is relatively inexpensive to build, easy to operate and is a portable apparatus that can be quickly moved to a position downstream of a blow molding machine for spin trimming the dome scrap from hollow, plastic bottles produced by the blow molding machine. These and other objects will become increasingly apparent by reference to the following descriptions and to the drawings.

IN THE DRAWINGS

FIG. 1 is a perspective view of the trimmer apparatus 10 of the present invention showing the two moveable belts 64 and 90 for moving and spinning a plastic bottle past the knife blade 112 for removing the dome scrap from the bottle.

Figure 2:
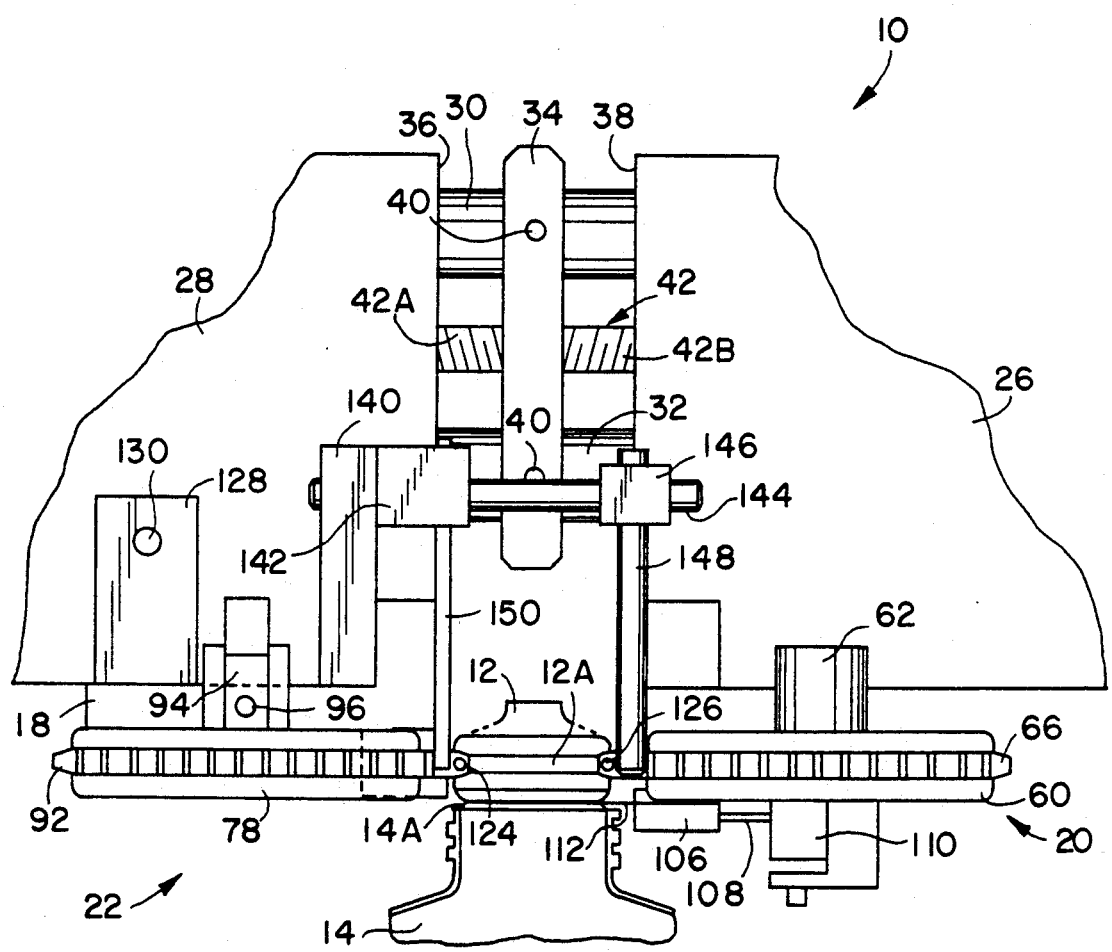

FIG. 2 is a partial exit view of the trimmer apparatus 10 of FIG. 1 and showing the dome scrap 12 being removed from the bottle 14 by the knife blade 112.

Figure 3:
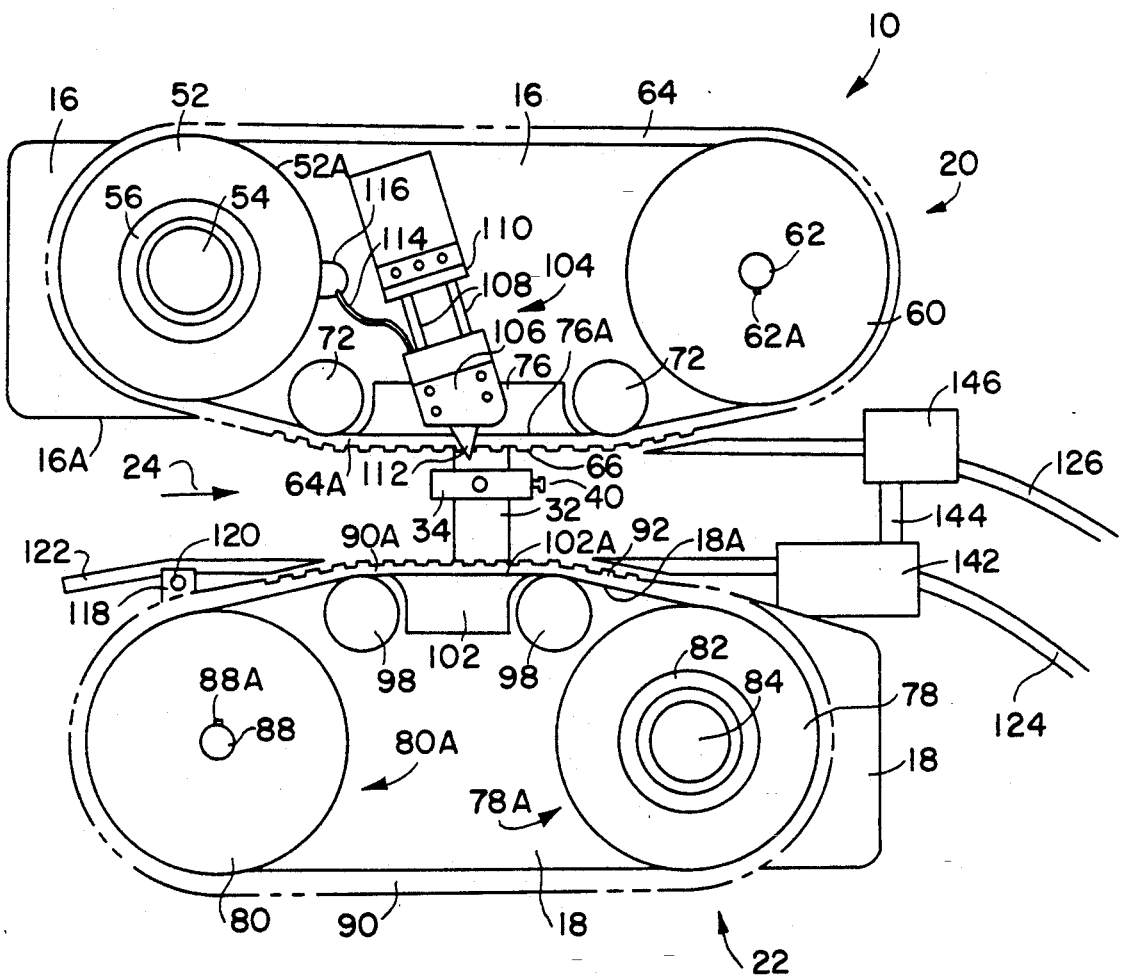

FIG. 3 is a bottom plan view of the trimmer apparatus 10 of FIG. 1 and showing the dual pulley systems 20 and 22 supporting the belts 64 and 90 and the knife blade 112 extending inwardly into the path 24.

Figure 4:
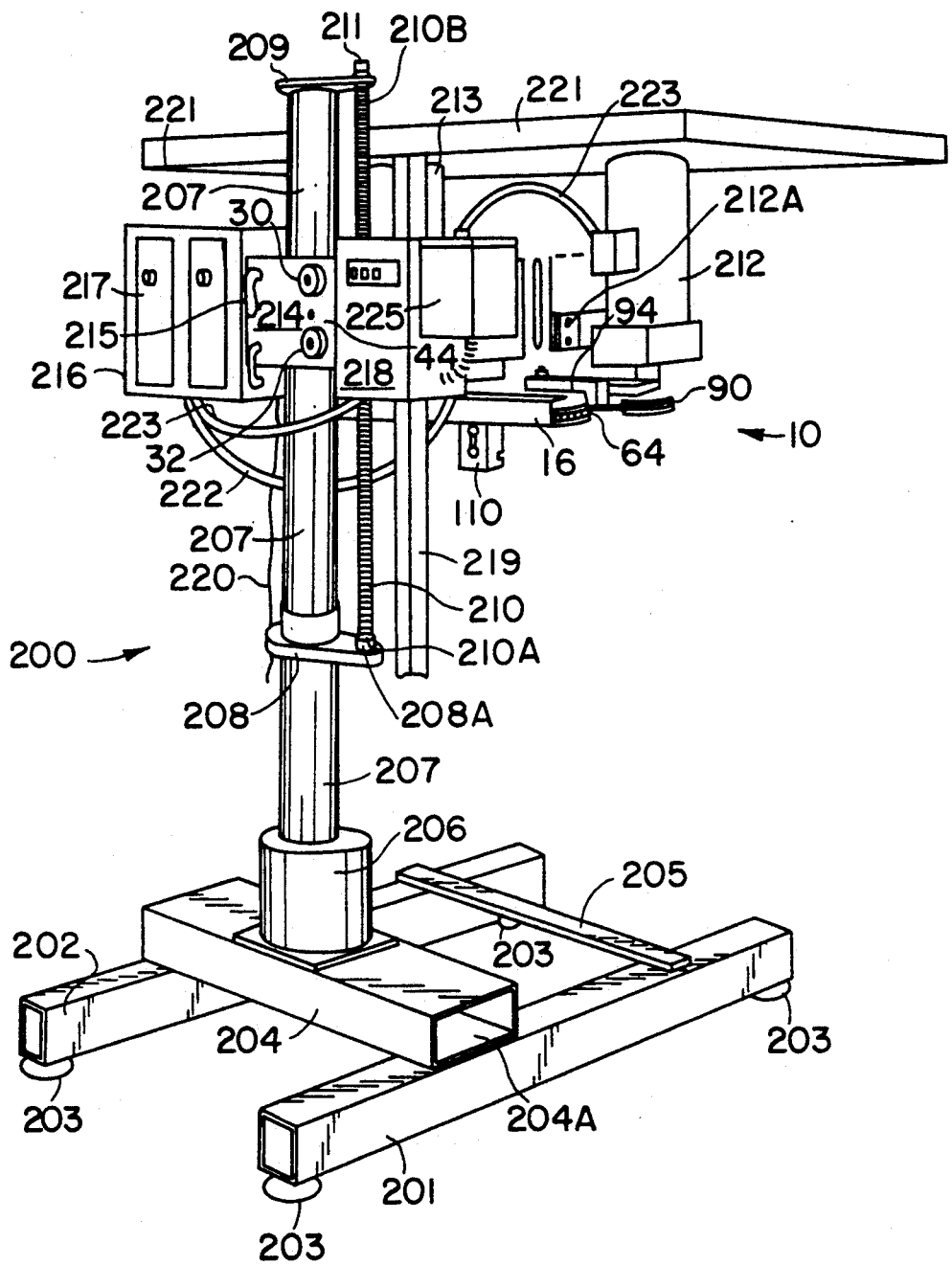

FIG. 4 is a front full view of the trimmer apparatus 10 of FIG. 1 showing the frame 200, the operational controls 217 and 218, the motors 212 and 213 and the end plate 214.

GENERAL DESCRIPTION

The present invention relates to a trimmer apparatus for removing a dome scrap from a blow molded, plastic container means, which comprises: a frame means defining a path through the apparatus; a first moveable belt means having a first belt portion positioned along the path, wherein the first belt means is connected to a drive means mounted on the frame means for moving the first belt means; a second moveable belt means having a second belt portion positioned along the path wherein the second belt means is connected to the drive means which provides for moving the second belt means and wherein the second belt portion in conjunction with the first belt portion provides for spinning the container means about a longitudinal axis of the container means as the container means moves along the path; and a knife means mounted adjacent either the first or the second belt portions with a cutting edge of the knife means projecting into the path and beyond the adjacent first or second belt portions to provide for cutting the dome scrap from the container means as the container means is spun and is moved along the path by the first and second moveable belt means.

SPECIFIC DESCRIPTION

FIGS. 1 to 4 show the improved trimmer apparatus 10 of the present invention for removing a dome scrap portion 12 from a blow molded, plastic bottle 14 (FIG. 2). The trimmer apparatus 10 is supported by a frame 200 that is preferably provided with rollers or casters 203 for moving the trimmer apparatus 10 from one trimming station positioned at the outlet of a plastic blow molding machine (not shown) to another. The blow molding machine can be of any type well known to those skilled in the art for producing the plastic bottle 14. The dome scrap 12 is formed as an integral part of the bottle 14 and needs to be trimmed or otherwise removed so that a screw cap (not shown) or some similar closure device can be mounted on the open end of the bottle 14.

As shown in perspective in FIG. 1, the trimmer apparatus 10 is comprised of a first and a second support plates 16 and 18 that each provide for mounting a respective pulley system 20 and 22. As shown in bottom plan view in FIG. 3, a path along which the bottle 14 travels through the trimming apparatus 10 is provided between the support plates, as indicated by arrow 24.

The first support plate 16 is mounted on the underside of a first moveable block 26 connected to the frame 200 (FIG. 4). Similarly, the second support plate 18 is mounted on the underside of a second moveable block 28 (FIG. 2), which is also connected to the frame 200. The second moveable block 28 has been removed from FIG. 1 for the purpose of clarity.

The blocks 26 and 28 are supported in a spaced apart relationship by an upper guide shaft 30 and a lower guide shaft 32, which are connected together by a central positioning bar 34. The guide shafts 30 and 32 mate with openings provided on the inside sidewalls 36 and 38 of the blocks 26 and 28, and enable the blocks to move towards and away from each other. The positioning bar 34 is provided with set screws 40 that help maintain the spaced apart distance between the blocks 26 and 28 fixed during a trimming operation. The positioning bar 34 is also provided with a threaded rod 42 at an intermediate position between the guide shafts 30 and 32. As particularly shown in FIG. 2, threaded rod 42 is provided with a left hand threaded portion 42A that is threadably received by a nut (not shown) housed inside the block 26 and held in place by a removeable plate 46 (FIG. 1). Similarly, a right hand threaded portion 42B is threadably received by a mating nut (not shown) mounted inside block 28.

The threaded rod 42 extends through the block 26 and through end plate 214 to a bolt head 44 mounted adjacent the end plate 214. This position corresponds to the front of the trimmer apparatus 10 where the operational controls 217 and 218 (FIG. 4) are located. The bolt head 44 is turned by a wrench to rotate the threaded rod 42. This provides for threading and unthreading the left hand threaded and the right hand threaded portions 42A and 42B of rod 42 for widening and narrowing the width of the path 24 through the trimmer apparatus 10, depending on a particular bottle 14 size. The portion of the threaded rod 42 mounted inside the positioning bar 34 is not threaded and the bar 34 helps to keep the blocks 26 and 28 in a proper alignment with respect to each other.

The first support plate 16, mounted on the underside of the first block 26, has a generally rectangular shape that provides for mounting a free spinning wheel 52 comprising a portion of pulley system 20. Wheel 52 is rotatably mounted on a shaft 54 having a bearing 56. The shaft 54 in turn is connected to the plate 16 by a threaded nut and washer combination 58.

The pulley system 20 is further provided with a drive wheel 60 which is fixed by a key 62A to a drive shaft 62, (FIG. 3), that is rotated by a drive motor 213 (FIG. 4). The drive motor 213 has been removed for clarity in FIGS. 1 and 2, but is mounted on the block 26 by a motor mount (not shown) to rotate the drive shaft 62. The drive motor 213 is preferably adjustable through a wide range of rotation speeds. A drive belt 64 is supported between the free spinning wheel 52 and the drive wheel 60 and is provided with tread 66 that helps grip the plastic bottle 14 but is not essential to the practice of the invention. The drive belt 64 is preferably mounted in grooves 52A and 60A provided on the wheels 52 and 60 so that the belt 64 does not slip as it moves.

An L-shaped bar 68 is mounted between the nut and washer 58 and the plate 16. A downwardly angled foot portion 68A extends adjacent the end of plate 16 and free spinning wheel 52 and is provided with an adjustment screw 70 that threads against the end of plate 16. Adjustment screw 70 enables the L-shaped bar 68 together with the shaft 54 and wheel 52 to slide along a slot (not shown) provided in the plate 16 for adjusting the tension of belt 64 mounted on the pulley wheels 52 and 60 and for releasing the belt 64 from the pulley system 20 to change the belt 64.

Support plate 16 is further provided with a pair of spaced apart rollers 72 that are each rotatably mounted adjacent the inner edge 16A of plate 16 by a threaded nut and washer combination 74. The drive belt 64 rides over the rollers 72 with a portion 64A of the belt 64 positioned outwardly, beyond a plane tangibly intersecting the annular extent of the wheels 52 and 60, and beyond the inner edge 16A of the plate 16.

As shown in bottom plan view in FIG. 3, the first support plate 16 includes a guide bar 76 that is mounted between the spaced apart rollers 72. The guide bar 76 has an inner side 76A that helps support the extended portion 64A of belt 64. This keeps the belt 64 in a steady rotation as the bottle 14 moves along the belt 64.

The second support plate 18, which is similar to the first plate 16, is mounted on the underside of the second block 28. The second plate 18 provides for mounting the second pulley system 22 comprised of a free spinning wheel 78 and a drive wheel 80. The free spinning wheel 78 is mounted on a bearing 82 supported by a shaft 84. The shaft 84 is connected to the plate 18 by a threaded nut and washer combination 86. The pulley system 22 is further provided with the drive wheel 80, which is fixed by a key 88A to a drive shaft 88 (FIG. 3) that is rotated by a drive motor 212 (FIG. 4). The drive motor 212 has been removed for clarity in FIGS. 1 and 2, but is mounted on the block 28 by a motor mount 212A (FIG. 4) to rotate drive shaft 88. The drive motor 212 is preferably adjustable through a wide range of rotation speeds. A drive belt 90 is connected between the free spinning wheel 78 and the drive wheel 80 and is provided with tread 92 that helps grip the plastic bottle 14 but is not essential to the practice of the invention. The drive belt 90 is preferably mounted in grooves 78A and 80A provided on the wheels 78 and 80 so that the belt 90 does not slip as it moves.

An L-shaped bar 94 is mounted between the nut and washer 86 and the plate 18. A downwardly angled foot portion 94A extends adjacent the end of plate 18 and adjacent the free spinning wheel 78 and is provided with an adjustment screw 96 (FIG. 2) that threads against the end of plate 18. Adjustment screw 96 enables the L-shaped bar 94 together with the shaft 84 and wheel 78 to slide along a slot (not shown) provided in the plate 18 for adjusting the tension of belt 90 mounted on the pulley wheels 78 and 80 and for releasing the belt 90 from the pulley system 22 to change the belt 90.

Second support plate 18 has a pair of spaced apart rollers 98 that are each rotatably mounted adjacent the inner edge 18A of the plate 18 by a threaded nut and washer combination 100. The drive belt 90 rides over the rollers 98 which serve to position an extended portion 90A of the belt 90 outwardly, beyond a plane tangibly intersecting the annular extent of the wheels 78 and 80, and beyond the inner edge 18A of the plate 18. A guide bar 102 is mounted between the spaced apart rollers 98. The guide bar 102 has an inner side 102A that helps support the extended portion 90A of belt 90 in a steady rotation as the bottle 14 moves along the belt 90.

As particularly shown in FIGS. 2 and 3, a cutting device 104 is mounted on the underside of the first support plate 16. The cutting device 104 includes a holder member 106 that is positioned beneath the guide bar 76. A pair of adjustment pins 108 extend from the holder member 106 and are slideably mounted in an adjustment block 110 mounted on the support plate 16. The adjustment block 110 has a pair of corresponding set screws (not shown) that enable the pins 108 along with the holder member 106 supporting a knife blade 112, to move inwardly and outwardly with respect to the inner side 76A of the guide bar 76 and the extended portion 64A of belt 64. A knife edge of blade 112 extends into the path 24 formed between the support plates 16 and 18. As shown in FIG. 3, as the bottle 14 moves along the path 24, the knife blade 112 is positioned at a height corresponding to a groove 14A formed at the junction of the plastic bottle 14 and the dome scrap 12. The knife blade is provided with a sharp pointed edge which projects into the groove 14A. The cutting device 104 is preferably provided with a heater element (not shown) that is supplied with power by conductors 114. The conductors 114 feed through an opening 116 in the support plate 16 and are connected to a power source 225 (FIG. 4).

A bracket 118 having an L-shape in plan view, is mounted on the support plate 18 adjacent the drive wheel 80. A pair of pins 120 are slideably mounted in the bracket 118 and support a guide rod 122 at their lower end. The bracket 118 is provided with adjustment means (not shown), such as set screws that enable the pins 120 and the accompanying guide rod 122 to be moved up or down with respect to the belt 90. The guide rod 122 mates with an annular groove 12A (FIG. 2) provided on the dome scrap 12 and helps align and guide the bottle 14 as the bottle 14 is moved along the path 24 by an endless conveyor (not shown) towards the moveable belts 64 and 90 and the knife 112.

The trimmer apparatus 10 is also provided with a pair of spaced apart guide rails 124 and 126 that serve to channel the dome scrap 12 away from the trimmer apparatus 10 after the dome scrap 12 has been cut from the bottle 14. The guide rails 124 and 126 are mounted on the second support plate 18 by a first block 128 holding a cantilever rod 130. A pair of spaced apart moveable blocks 132 and 134 are secured to the rod 130 by an adjustment means (not shown), such as a set screw, that enables the blocks 132 and 134 to slide axially along the rod 130. The moveable blocks 132 and 134 are provided with vertically moveable pins 136 and 138 that are also adjustable by means of a set screw (not shown). The moveable rod 130 thus provides for moving the guide rails 124 and 126 towards and away from the moveable belts 64 and 90 while the pins 136 and 138 provide for raising and lowering the vertical height of the guide rails 124 and 126.

A second block 140 extends upwardly from the support plate 18 and holds a cantilever block 142. A support rod 144 extends through the cantilever block 142 and supports a block 146 and moveable pin 148. Pin 148 provides for raising and lowering the height of guide rail 126. Similarly, the cantilever block 142 holds a pin 150 that is vertically moveable to adjust the height of guide rail 124. The position of the guide rails 124 and 126 are thus vertically moveable to adjust their position with respect to the moveable belts 64 and 90 to meet the dome scrap 12 after it has been cut from the bottle 14.

FIG. 4 shows the frame 200 supporting the trimmer apparatus 10. The frame 200 includes horizontal spaced apart support members 201 and 202 supporting castors 203. Braces 204 and 205 are mounted such as by welding or bolts, on members 201 and 202. The member 204 has a hollow rectangular opening 204A. Base 206 is secured by bolts or welding to the brace 204. A vertically oriented tubular member 207 is secured to the base 206. Spaced apart cantilevered plates 208 and 209 are mounted on the tubular member 207 such as by welding or the like. A vertically oriented threaded rod 210 is spaced from the tubular member 207. The ends 210A and 210B of the threaded rod 210 rotate freely relative to the plates 208 and 209. A recess 208A is provided on the plate 208 for the end 210A of the rod 210. The other end 210B of rod 210 is provided through an opening in the plate 209. A hexagonal cap 211 is provided on rod 210 to secure the rotatable rod 210. Motor 212 and 213 are supported by motor mounts 212A (one shown) on blocks 26 and 28. The shafts of motors 212 and 213 are shafts 62 and 88 (FIG. 1). An acme nut is mounted in end plate 214 (not shown) and rod 210 is rotated by a wrench on cap 211 to move the assembly 10 around the end plate 214 up and down vertically. Locks 215 and 216 secure the end plate 214 in place. Operation controls 217 and 218 provide the power supply for motors 212 and 213. End plate 214 is secured to block 26 so that the assembly 10 can be moved up and down. Guide shafts 30 and 32 project through the end plate 214 and are fixed to end plate 214. Vertical angle irons 219 and 220 provide a shield for the assembly 10 and are mounted on the end plate 214. Electrical cable 222 is mounted to motor 213 and 223 is connected to motor 212 to provide electricity to the motors 212 and 213.

As can be seen from FIG. 4, the assembly 10 can be moved to various locations and can be moved up and down and also the spacing between the belts 64 and 90 can be changed. The spacing between the belts 64 and 90 can be adjusted based upon the width of the bottle 14 above scrap 12 to be removed, all of this provides a very versatile apparatus.

IN USE

The trimmer apparatus 10 of the present invention is positioned at the outlet of a plastic blow molding machine (not shown). An endless conveyor (not shown) is positioned below and between the support plates 16 and 18 to provide the path 24 that the plastic bottles 14 travel between the plates 16 and 18. The motors 212 and 213 that actuate the drive wheels 60 and 80 are powered up to move the respective belts 64 and 90. As shown in FIG. 1, the belt 64 moves in a counterclockwise direction, as indicated by arrow 152 while belt 90 also moves in a counterclockwise direction, as indicated by arrow 154. However, belt 64 is moving at a somewhat greater speed so that the plastic bottle 14 is moved forward along the path 24 and through the trimmer apparatus 10. The first pulley system 20 extends approximately about 2 inches (5.08 cm) longer on both ends than the second pulley system 22. The belt 64 is greater in length than belt 90 such that belt 64 engages the bottle 14 first pulling the bottle into the trimming apparatus and maintains contact with the bottle 14 after belt 90 which moves the bottle 14 out of the trimming apparatus. Power is also applied to the heater element for the knife blade 112 by conductors 114. This is preferred because the heated knife blade 112 increases the efficiency of cutting the plastic bottle 14, especially when the plastic is warm and pliable.

As the bottle 14 moves on the conveyor towards the belts 64 and 90, the groove 12A in the dome scrap 12 receives the guide rod 122. Rail 122 serves to position and stabilize the bottle 14 before the dome scrap 12 is engaged by the moving belts 64 and 90, (FIG. 2). Even though the belts 64 and 90 are both turning in a similar direction, belt 64 is turning at a somewhat faster rate than belt 90. The belts 64 and 90 are moving in opposite directions adjacent to the dome scrap 12, as can be seen from FIGS. 1 and 3. This provides for moving the bottle 15 linearly along the path 24 while at the same time spinning the bottle 14. The bottle 14 is spun past the knife blade 112, which meets groove 14A and cuts the dome scrap 12 from the bottle 14.

The dome scrap 12 is carried by the belts 64 and 90 to the guide rails 124 and 126 and deposited there while the bottle 12 is moved away from the trimmer apparatus 10 by the conveyor. The bottle 14 is deposited in a collection means, ready for any necessary finishing steps. The dome scrap 12 is pushed along the guide rails 124 and 126 as each successive dome scrap 12 is removed from its bottle 14. As shown in FIG. 1, the guide rails 124 and 126 create a curved path that ends at a position, lateral of the linear path 24 through the trimmer apparatus 10. A waste collection receptacle (not shown) is positioned underneath the outboard end of the guide rails 124 and 126 for collecting the pieces of dome scrap 12 as they fall from the guide rails 124 and 126.

It is intended that the foregoing description be only illustrative of the present invention and that the present invention be limited only by the hereinafter appended claims.

I claim:

1. A trimmer apparatus for removing a dome scrap from a blow molded, plastic container means, which comprises:
   (a) a frame means defining a path through the apparatus;
   (b) a first moveable belt means having a first belt portion positioned along the path, wherein the first belt means is connected to a drive means mounted on the frame means for moving the first belt means;
   (c) a second moveable belt means having a second belt portion positioned along the path, wherein the second belt means is connected to the drive means which provides for moving the second belt means and wherein the second belt portion in conjunction with the first belt portion provides for spinning the container means about a longitudinal axis of the container means as the container means moves along the path; and (d) a knife means mounted adjacent either the first or the second belt portions with a cutting edge of the knife means projecting into the path and beyond the adjacent first or second belt portions to provide for cutting the dome scrap from the container means as the container means is spun and is moved along the path by the first and second moveable belt means.

2. The trimmer apparatus of claim 1 wherein the path is a linear path.

3. The trimmer apparatus of claim 2 wherein the first and second belt means are each mounted on a pair of rotatable pulley wheels with each pair of pulley wheels mounted on spaced apart first and second plate means supported on opposite sides of the path, wherein the spaced apart plate means are connected together by an adjustment means supported by the guide means that provides for adjusting spaced apart distances between the plate means.

4. The trimmer apparatus of claim 3 wherein the adjustment means is provided by a threaded rod means having opposed right and left handed threads mounted on spaced apart blocks supporting the plate means which are moved together and apart by the rod means.

5. The trimmer apparatus of claim 3 wherein each of the pulley wheels has a belt groove that provides for seating the belt means in the wheels.

6. The trimmer apparatus of claim 3 wherein a first support means is mounted between the pair of the opposed pulley wheels, supporting the first belt means with an inner portion of the first support means extending inwardly towards the path and beyond a first plane connecting the radial extent of the pulley wheels adjacent the path to provide for positioning the first belt portion inwardly beyond the first plane and wherein a second support means is mounted between the pair of the opposed pulley wheels supporting the second belt means with an inner portion of the second support means extending inwardly towards the path and beyond a second plane connecting the radial extent of the pulley wheels adjacent the path to provide for positioning the second belt portion inwardly beyond the second plane, and wherein the first and second belt portions contact the container means as the container means supported on the conveyor means, moves along the path to provide for spinning the container means about the longitudinal axis.

7. The trimmer apparatus of claim 6 wherein the first and second support means are a first and a second pair of roller means.

8. The trimmer apparatus of claim 7 wherein the first and second support means also includes a first and a second guide bar means positioned between the first and second pair of roller means for keeping the first and second belt means in steady rotation along the path.

9. The trimmer apparatus of claim 2 wherein the drive means causes the first and the second belt means to rotate in a similar direction so that the first belt portion moves in a forward direction, linearly along the path and the second belt portion moves in a backwards direction, linearly along the path and wherein the first belt means is rotating at a faster rate than the second belt means to spin the container means about the longitudinal axis as the container means moves along the path.

10. The trimmer apparatus of claim 9 wherein the first and second belt portions contact a groove between spaced apart annular enlarged portions of the dome scrap to spin the container means and wherein the knife means cuts along a notch provided below a lower annular enlarged portion to sever the dome scrap from the enlarged portion.

11. The trimmer apparatus of claim 1 wherein the frame means is provided with a roller means for horizontal movement of the frame means.

12. The trimmer apparatus of claim 1 wherein the frame means is provided with first and second spaced apart cantilevered plates mounting a threaded rod moveably supporting first and second plate means supporting the drive means for moving the belt means vertically in the frame means.

13. The trimmer apparatus of claim 1 wherein the knife means is heated by an electrically actuated heating means connected to the knife means.

14. The trimmer apparatus of claim 1 wherein the knife means has a sharp, pointed edge.

15. The trimmer apparatus of claim 1 wherein the first moveable belt means is greater in length than the second moveable belt means so that the second moveable belt means is positioned so as to be in contact with the container means only after the first moveable belt means is in contact with the container means and wherein the first moveable belt means is moving in the direction of the path.

16. The trimmer apparatus of claim 1 wherein the first moveable belt means is greater in length than the second moveable belt means so that the second moveable belt means is positioned within the length of the first moveable belt means to pull the container means into the path and to carry the container means out of the path and wherein the first moveable belt means is moving in the direction of the path.

17. The trimmer apparatus of claim 1 wherein the knife means is mounted a distance spaced below the belt means and the distance is vertically adjustable and wherein the knife is adjustable horizontally to change a depth of cut into the dome scrap.

18. The trimmer apparatus of claim 1 wherein a guide means is mounted on the frame means and serves to hold the longitudinal axis of the container means vertical as the container means is moved along the path before the container means is spun by the first and the second belt means.

19. The trimmer apparatus of claim 18 wherein the guide means is comprised of a rail means that rides in a rail groove provided between the spaced apart annular enlarged portions comprising the dome scrap of the bottle.

20. The trimmer apparatus of claim 1 wherein a removal means is provided for carrying away removed dome scrap.

21. The trimmer apparatus of claim 20 wherein the removal means is comprised of a first and second rail cantilevered to the frame means, adjacent the first and second moveable belt means after the dome scrap has been removed and curved away from the path for removal of the dome scrap.

* * * * *